(12) United States Patent
Terada (10) Patent No.: US 7,552,922 B2
(45) Date of Patent: Jun. 30, 2009

(54) IMAGE-FORMING APPARATUS (75) Inventor: Kohei Terada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 290 days.

(21) Appl. No.: 11/437,832

(22) Filed: May 22, 2006

(65) Prior Publication Data

US 2006/0261539 A1 Nov. 23, 2006

(30) Foreign Application Priority Data

May 20, 2005 (JP) .............................. 2005-147637

(51) Int. Cl.
*B65H 1/00* (2006.01)
(52) U.S. Cl. ..................... 271/162; 271/9.09; 399/125
(58) Field of Classification Search ................ 271/9.01, 271/9.09, 162; 399/125, 392
See application file for complete search history.

(56) References Cited

U.S. PATENT DOCUMENTS 4,412,734 A * 11/1983 Shibuya et al. .............. 399/124
6,470,160 B1 * 10/2002 Murakami .................. 399/124
7,263,312 B2 * 8/2007 Park ........................... 399/124
2002/0196481 A1 * 12/2002 Manabe et al. .............. 358/498

FOREIGN PATENT DOCUMENTS

| JP | 01275338 A | * | 11/1989 |
| JP | 103455 | | 10/1991 |
| JP | 04080154 A | * | 3/1992 |
| JP | 305584 | | 11/1994 |
| JP | 30060 | | 2/1996 |

* cited by examiner

*Primary Examiner*—Patrick H Mackey
*Assistant Examiner*—Jeremy Severson
(74) *Attorney, Agent, or Firm*—Baker Botts, LLP (57) ABSTRACT

An image-forming apparatus includes a printer section which performs image recording, a tray accommodating section which is provided on the upper surface of the printer section, and a tray of which a posture can be changed to a paper-feeding posture which enables loading of a recording paper, and an accommodation posture in which the tray is accommodated in the tray accommodating section. Accordingly, there is provided the image-forming apparatus in which the tray, usable also as a manual feeding tray, can be accommodated compactly when the tray is not to be used.

9 Claims, 7 Drawing Sheets

IMAGE-FORMING APPARATUS

CROSS REFERENCE TO RELATED APPLICATION

The present application claims priority from Japanese Patent Application No. 2005-147637, filed on May 20, 2005, the disclosure of which is incorporated herein by reference in its entirety.

BACKGROUND OF THE INVENTION

1. Field of the Invention

The present invention relates to an image-forming apparatus which includes an image recording section having a transporting path starting from a tray on which a recording paper is kept (placed) and reaching up to a discharging section, and which performs recording of an image; and an image recording section which is provided above the image recording section, and which performs reading of an image on a document.

2. Description of the Related Art

Image-forming apparatuses, in which a printer section which performs recording of an image on a recording paper, and a scanner section which performs reading an image on a document are integrated, are hitherto known. Many of such image-forming apparatuses have a construction in which a scanner section which is used as a flat-bed scanner is arranged above the printer section so as to make it easy to perform an operation for opening and closing a scanner cover, and to make it easy to place the document. Further, some of these image-forming apparatuses has a construction in which, in the printer section, a paper feeding tray and a paper discharging tray are provided on a front-surface side of the apparatus, and the recording paper is transported from the paper feeding tray via a U-turn path leading to the paper discharging tray, in order to enable loading and taking out (discharging) of a recording paper from a front side of the apparatus. Furthermore, some of conventional image-forming apparatuses are provided with a manual-feeding tray for performing image recording (formation) by using a recording paper of which size or type is different from that of the recording paper placed in the paper feeding tray (see, for example, Japanese Patent Application Laid-open No. 6-305584).

Figure 7:
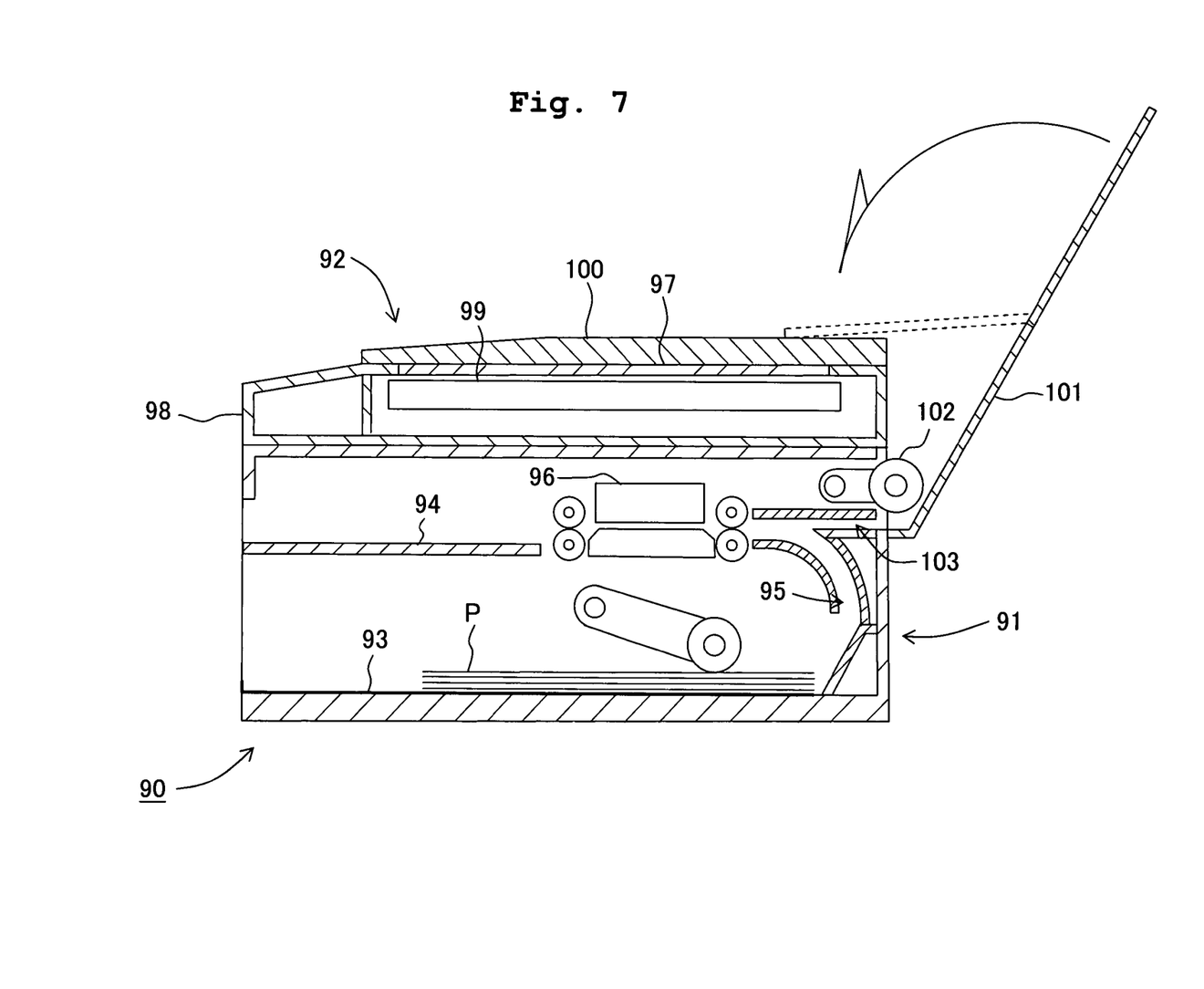
FIG. 7 is a longitudinal cross-sectional view showing a structure of a conventional image-forming apparatus 90.

FIG. 7 is a diagram showing an example of a conventional image-forming apparatus. As shown in FIG. 7, in an image-forming apparatus 90, a printer section 91 is arranged on a lower side of the image-forming apparatus 90, and a scanner section 92 is arranged above (on an upper side of) the printer section 91. In the printer section 91, a transporting path 95 having a horizontal U-shape is formed from a paper feeding tray 93 to a paper discharging tray 94. In this printer section 91, a recording paper P placed in the paper feeding tray 93 is transported in the transporting path 95 while being turned over upwardly, and image recording is performed by a recording head 96. On the other hand, in the scanner section 92, an image scanner 99 is provided in a document placing and reading platform 98 such that the image scanner 99 is reciprocally movable. A platen glass 97 is arranged on the upper surface of the document placing and reading platform 98. Further, a scanner cover 100 is provided to be openable and closable on the upper side of the document placing and reading platform 98 such that the scanner cover 100 covers the platen glass 97. In this scanner section 92, reading of an image on a document (original), which is placed on the platen glass 97, is performed by scanning the image scanner 99 with respect to the document.

On a rear-surface side of the image-forming apparatus 90, a manual feeding tray 101 tilting in an obliquely upward direction is provided. The manual feeding tray 101 holds a lower side of the recording paper and supports the recording paper such that the recording paper is inclined at a predetermined angle. Further, a paper feeding roller 102 is provided facing the manual feeding tray 101, and by the rotation of the paper feeding roller 102, the recording paper on the manual feeding tray 101 is fed. Furthermore, on the rear-surface side (rear side) of the image-forming apparatus 90, an auxiliary transporting path 103 starting from the manual feeding tray 101 and leading to an upstream side of the recording head 96 in the transporting path 95 is formed. The recording paper fed from the manual feeding tray 101 is guided to the upstream side of the recording head 96 via the auxiliary transporting path 103. Further, the image is recorded on the recording paper by the recording head 96, and the recording paper is discharged to the paper discharging tray 94.

SUMMARY OF THE INVENTION

By arranging the paper feeding tray 93 and the paper discharging tray 94 on the front-surface side of the image-forming apparatus 90 as in the printer section 91 of the image-forming apparatus 90, the recording paper can be loaded and taken out from the front-surface side of the image-forming apparatus 90. Further, since the image-forming apparatus 90 can be installed, with the rear surface of the apparatus being close to a wall or the like, there is an advantage that a space for installing the image-forming apparatus 90 can be small, thereby saving space. However, when the manual feeding tray 101 is provided on the rear-surface side of the image-forming apparatus 90 as described above, there is a problem that a space required for a projected portion of the manual feeding tray 101 is to be secured on the rear-surface side of the apparatus, thereby losing the merit of saving the space.

Further, it is conceivable to make the manual feeding tray 101 to be detachable from the body of the image-forming apparatus 90, and to use the manual feeding tray 101 by attaching the manual feeding tray 101 to the body of the image-forming apparatus 90 only when required. However, operation for detaching and attaching the manual feeding tray 101 from and to the rear-surface side of the image-forming apparatus 90 is a cumbersome job, and there is a fear that the manual feeding tray 101 is lost.

Furthermore, as shown in FIG. 7, an image-forming apparatus is proposed in which an upper portion of the manual feeding tray 101, above the central portion thereof, is structured to be foldable toward a front side of the image-forming apparatus. By folding the upper portion of the manual feeding tray 101 when the manual feeding tray 101 is not used, there is an advantage that the space on the rear-surface side of the image-forming apparatus is saved, and that the dust can be prevented from entering inside the image-forming apparatus from the auxiliary transporting path 103. However, as shown in the diagram, the folded manual feeding tray 101 is laid over and against the scanner cover 100. Therefore, for opening the scanner cover 100, the manual feeding tray 101 is to be returned to its original (unfolded) shape. Accordingly, there is a problem that the structure is not convenient for use.

The present invention is made in view of such problems, and an object of the present invention is, in an image-forming apparatus including an image recording section which has a transporting path in which a recording paper is transported, and in which image-recording is performed; an image reading section which is arranged above the image recording section, and which performs reading of an image on a document, to provide a tray which can be used as a manual feeding tray for example, and to provide a mechanism in which the tray can be compactly accommodated when the tray is not used.

According to a first aspect of the present invention, there is provided an image-forming apparatus which performs image-recording onto a recording paper and performs image-reading from a document, the image-forming apparatus including:

an image recording section which has a transporting path in which the recording paper is transported, and which records an image on the recording paper at an image recording position in the transporting path;

a tray on which the recording paper is placed;

an image reading section which is provided above the image recording section, and which reads an image from the document; and a tray accommodating section which is provided between the image recording section and the image reading section, and which accommodates the tray; wherein:

the image reading section is provided to be movable such that the tray accommodating section is opened; and a posture of the tray is changeable to a paper-feeding posture in which the tray guides the recording paper to the transporting path and to an accommodation posture in which the tray is accommodated in the tray accommodating section.

According to the first aspect of the present invention, when the tray is used, the recording paper can be loaded to the tray by making the tray to assume the paper-feeding posture, and when the tray is not used, the tray accommodating section is opened by opening the image reading section, and the tray can be accommodated in the tray accommodating section by making the tray to assume the accommodation posture. Accordingly, the tray is accommodated in the image-forming apparatus. Therefore, when the tray is not used, the saving of space can be realized, and a member projecting around the image-forming apparatus can be stashed. Further, since it is not necessary to remove the tray when the tray is not to be used, there is no fear that the tray is lost.

In the image-forming apparatus of the present invention, the tray may be an auxiliary tray, and the image-forming apparatus may have a main tray which is different from the auxiliary tray. Even when the auxiliary tray is accommodated in the tray accommodating section of the image-forming apparatus, the image recording section (printer section) can be used by using the main tray. Further, by using the auxiliary tray to feed a recording paper of a size and type which is used less frequently, it is possible to load (place), at all time, a recording paper of a size and type which is used frequently in a placing section of the main tray. Thus, this is convenient since, there is no need to change the recording papers in the main tray in order to use recording papers of different sizes and types.

In the image-forming apparatus of the present invention, the image recording section may further include an auxiliary transporting path which is merged with the transporting path on an upstream side of the image recording position in the transporting path, and which has an opening which is opened toward a side portion of the image recording section;

the image reading section may include a paper feeding mechanism which is provided to be capable of making contact with the auxiliary tray in the paper-feeding posture;

the transporting path may communicate with a placing section of the main tray on which the recording paper is placed and a discharge section to which the recording paper is discharged; and the auxiliary tray may be formed to project toward a side portion of the image-forming apparatus from the opening of the auxiliary transporting path.

In this case, since the auxiliary tray is provided in a shape projecting toward a side portion of the image-forming apparatus (sideway of) the image recording section (printer section), there is no fear that the auxiliary tray and the image recording section interfere with each other while using the image reading section provided above the image recording section.

In the image-forming apparatus of the present invention, the tray accommodating section may be formed as a recess in an upper surface of the image recording section, and the image reading section may be moved such that an upper side of the tray accommodating section is opened. In this case, since the tray accommodating section is formed as the recess in the image recording section, a structure of the tray accommodating section can be simplified, and the number of parts or components can be decreased. Further, the structure of the tray accommodating section can be simplified even compared to a structure in which the tray accommodating section is provided to a movable image-reading section.

In the image-forming apparatus of the present invention, the auxiliary tray may include: a front-end holding portion which holds a front end, of the recording paper, in a transporting direction; an inclined supporting portion which inclines the recording paper at a predetermined angle appropriate for paper feeding and supports the recording paper; and a spindle which is provided, in a direction orthogonal to the transporting direction, at a downstream portion of the front-end holding portion in the transporting direction; and the posture of the auxiliary tray may be changed to the paper-feeding posture and to the accommodation posture, by turning the auxiliary tray around the spindle.

By turning (rotating) the auxiliary tray around the spindle, the posture can be changed easily to the paper-feeding posture and to the accommodation posture. Further, due to the spindle provided on the downstream portion of the front end holding portion, it is possible to lower (reduce) the height of the auxiliary tray in the accommodation posture. Therefore, the tray accommodating section can be occupied in a reduced space, thereby saving the space, and a reduction in a size of the image-forming apparatus can be realized.

In the image-forming apparatus of the present invention, the paper feeding mechanism may include an arm which is swingably supported by the image reading section; and a paper feeding roller which is rotatably supported by a front end of the arm. In this case, the recording paper placed on the auxiliary tray can be separated from another recording paper placed in the auxiliary tray and fed by using the paper feeding roller.

In the image-forming apparatus of the present invention, a roller accommodating section which accommodates the paper feeding roller may be formed as a recess in a lower surface of the image reading section. In this case, when the tray is made to be in the accommodation posture, by retracting the paper feeding roller to the roller accommodating section, the tray accommodating section can be occupied in a reduced space, thereby saving the space, and the reduction in the size of the image-forming apparatus can be realized.

In the image-forming apparatus of the present invention, the discharge section may be arranged above the placing section; the transporting path may be formed to have a horizontally-oriented U-shape such that the transporting path connects the placing section and the discharge section; and the auxiliary transporting path may be connected to an upper portion of the U-shaped transporting path.

By making the transporting path to be U-shaped (to have the shape of an alphabet "U"), the placing section of the recording paper and the discharge section of the recording paper can be provided on one side of the image-forming apparatus. Therefore, an operability of the image-forming apparatus is improved. Further, the auxiliary transporting path communicating with the auxiliary tray is connected to the upper portion of the U-shaped transporting path, and there are few curves in the auxiliary transporting path. Therefore, the auxiliary path is suitable even for a recording paper which is thick.

In the image-forming apparatus of the present invention, the opening of the auxiliary transporting path may be closed by the auxiliary tray when the auxiliary tray is accommodated in the tray accommodating section. In this case, when the auxiliary tray is in the accommodation posture, for example, the front-end holding portion of the auxiliary tray closes the opening of the auxiliary transporting path. Therefore, the dust can be prevented from entering into the image-forming apparatus.

According to a second aspect of the present invention, there is provided an image-forming apparatus which performs image-recording on a recording paper, and performs image-reading from a document, the image-forming apparatus including:

an image recording section which includes a recording head; an image reading section which reads an image on the document; and a tray on which the recording paper is placed, and which guides the recording paper toward the recording head, the tray being accommodatable between the image recording section and the image reading section.

According to the second aspect of the present invention, when the tray is not required to be used, for example, when only the image reading section is used, the tray can be accommodated between the image recording section and the image reading section. Accordingly, an installation area of the image-forming apparatus can be reduced. Further, since the tray is not removed, there is no fear that the tray is lost.

DETAILED DESCRIPTION OF THE PREFERRED EMBODIMENTS

Figure 1:
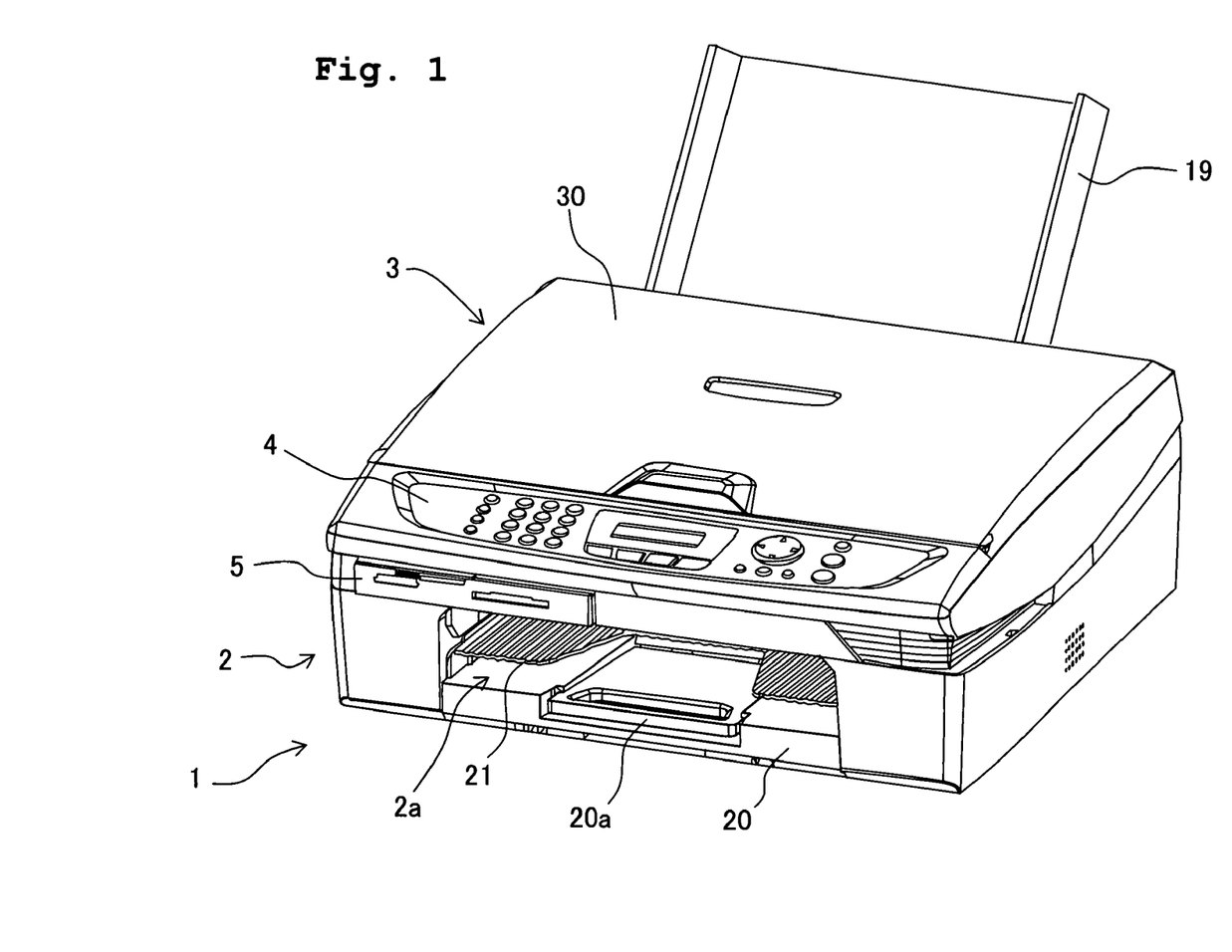
FIG. 1 is a perspective view showing an external structure of a multi-function device 1 according to an embodiment of the present invention.

An embodiment of the present invention will be explained below with reference to the accompanying diagrams. FIG. 1 is a diagram showing an external structure of a multi-function device 1 (image-forming apparatus) according to the embodiment of the present invention. The multi-function device (MFD) 1 integrally includes a printer section 2 at a lower portion, and a scanner section 3 at an upper portion, and which has functions such as a printer function, a scanner function, and a copy function. The functions other than the printer function and the scanner function are arbitrary functions. Further, a plurality of paper feeding cassettes and an auto document feeder (ADF) may be provided to the scanner section 3 of the multi-function device 1.

The multi-function device 1 is connected mainly to a computer (external information device) which is not shown in the diagram. In this multi-function device 1, based on printing data which includes image data and/or text data transmitted from the computer, the printer section 2 records an image and/or a text on a recording paper, and image data read by the scanner section 3 is transmitted to the computer. Apart from this, it is also possible to connect the multi-function device 1 to an external device such as a digital camera so as to record, on the recording paper, image data which is outputted from the external device. Further, it is also possible to install various recording media such as a memory card, and to record image data, recorded (stored) on the recording medium, onto the recording paper by the printer section 2. Furthermore, it is also possible to record (store) image data read by the scanner section 3 on various types of recording media.

As shown in FIG. 1, the multi-function device 1 has a wide width and is a thin rectangular shaped machine, and the lower portion of the multi-function device 1 is the printer section 2. On a front surface of the printer section 2, an opening 2a is formed. A paper feeding tray 20 (main tray, placing section for recording paper) and a paper discharging tray 21 (recording paper discharging section) are provided as double-decked trays at upper and lower portions of the opening 2a, respectively, such that a part of the printer section 2 is exposed from (at) the opening 2a. The paper feeding tray 20 is for storing recording papers which is a recording medium, and recording papers of various sizes such as A4 size, B5 size, and post-card size can be accommodated in the paper feeding tray 20. A tray surface of the paper feeding tray 20 is widened (increased) by drawing a slide tray 20a out according to the requirement. The recording paper accommodated in the paper feeding tray 20 is fed to the printer section 2, a desired image is recorded thereon, and the recording paper is discharged to the paper discharging tray 21.

An auxiliary tray 19 is provided on a side of the rear-surface of the multi-function device 1. A detail structure of this auxiliary tray 19 will be described later. Recording papers of various sizes can be accommodated also in the auxiliary tray 19. The recording paper loaded in the auxiliary tray 19 is fed into the printer section 2, a desired image is recorded thereon, and the recording paper is discharged to the paper discharging tray 21.

Figure 3:
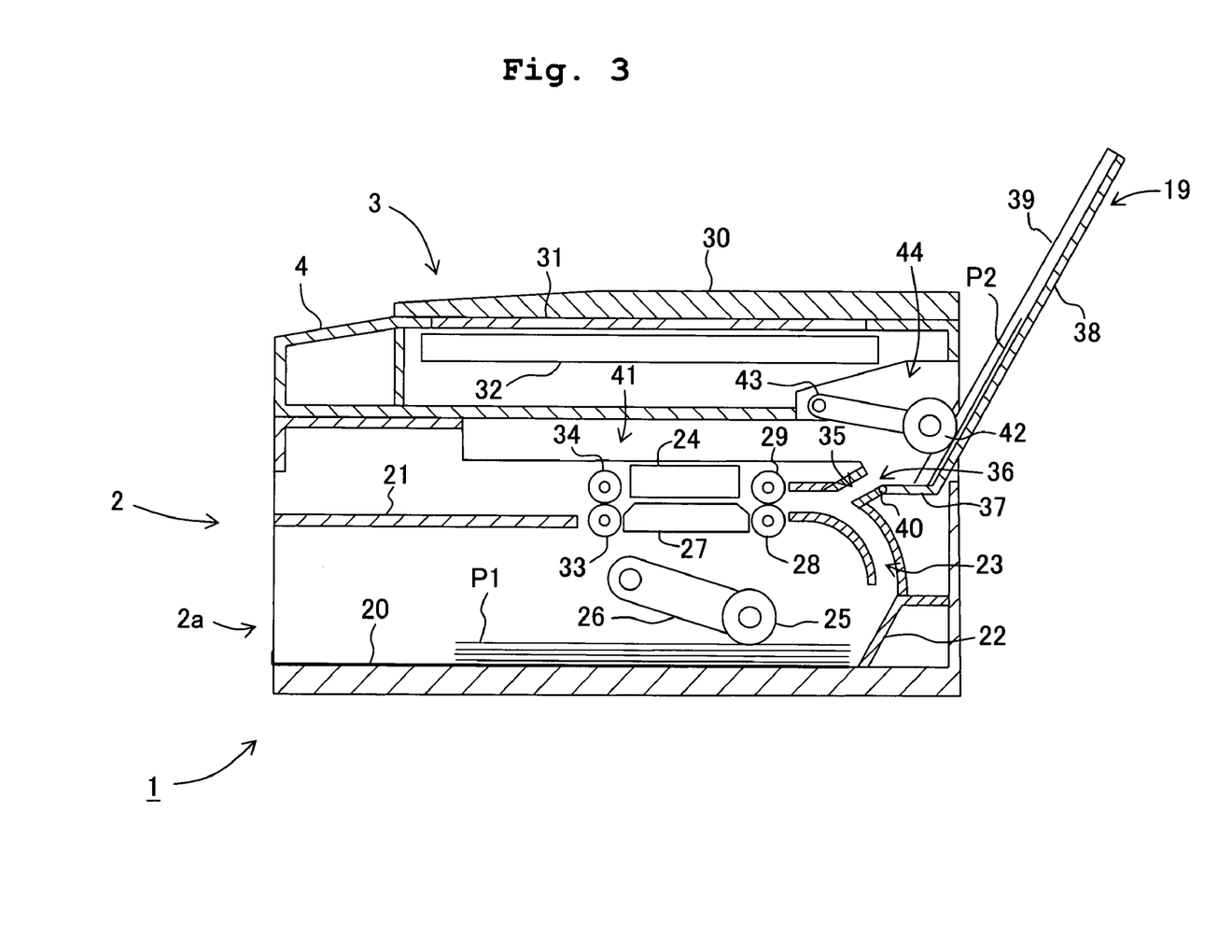
FIG. 3 is a longitudinal cross-sectional view of a main structure of inside of the multi-function device 1.

The upper section of the multi-function device 1 is a scanner section 3 which is a so-called flat-bed scanner. As shown in FIGS. 1 and 3, a platen glass 31 and an image sensor 32 are provided on a lower side of the scanner cover 30 which is provided to be openable/closable as a top plate (top panel) of the multi-function device 1. The platen glass 31 is for placing a document (original) from which the image is read or picked up. The image sensor 32, having a depth direction of the multi-function device 1 as a main scanning direction, is provided below the platen glass 31. The image sensor 32 is installed to a scanning carriage, and can scan in a width direction of the multi-function device 1 by receiving a driving force from a carriage motor.

Figure 2:
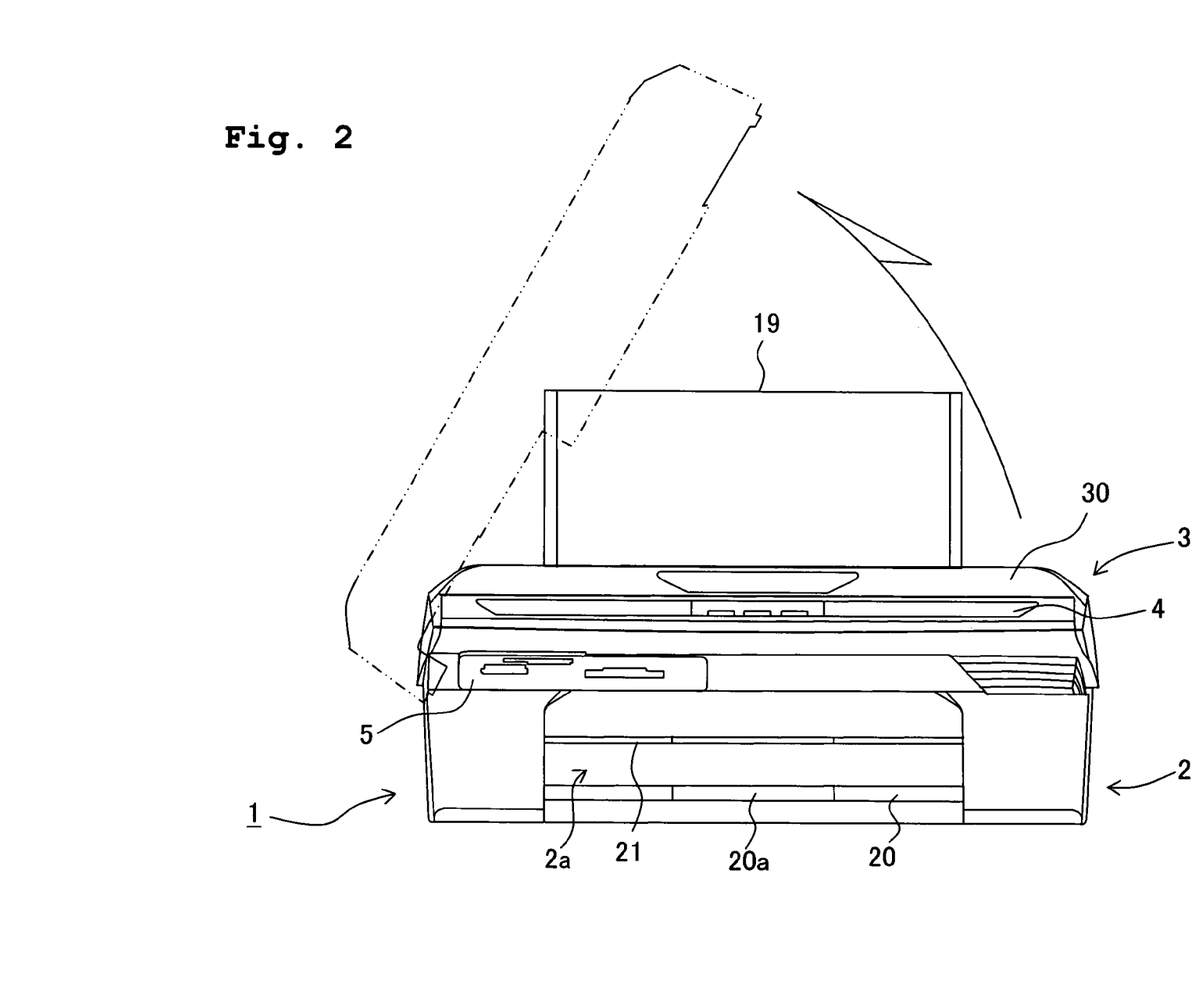
FIG. 2 is a front view showing the external structure of the multi-function device machine 1.

As shown in FIG. 2, the scanner section 3 is integrated with a housing constructing the scanner section 3, and is openable/closable such that the upper side of the printer section 2 is opened (exposed). Specifically, a lower tip of one end side in a side surface of the scanner section 3 and an upper tip of one end side in a side surface of the printer section 2 are connected by a hinged structure (hinge) The other end side of the scanner section 3 is rotatable (pivotable, turnable) upwardly, with the hinge as the axis of rotation. Accordingly, an upper surface of the printer section 2 is exposed, and the auxiliary tray 19 can be accommodated as will be described later. Further, by opening the scanner section 3, maintenance jobs such as jamming treatment (measures taken when jamming occurs) and replacement of an ink cartridge can be performed easily.

An operation panel 4 for operating the printer section 2 and the scanner section 3 is provided in an upper portion on the front-surface of the multi-function device 1. The operation panel 4 has various types of operation buttons and a liquid crystal display section. The multi-function device 1 is operated based on an operation instruction from the operation panel 4, and when the multi-function device 1 is connected to a computer, the multi-function device 1 is operated based on an instruction transmitted from the computer via a printer driver or a scanner driver. Further, a slot section 5 in which various types of small memory cards as a recording medium can be loaded (inserted) is provided on an upper left portion of the front surface of the multi-function device 1. Image data recorded in a small memory card loaded (inserted) in the slot section 5 can be read, and information related to the image data can be displayed on the liquid crystal display section. Further, based on a command inputted from (via) the operation panel 4, a desired image can be recorded on the recording paper by the printer section 2.

FIG. 3 is a diagram showing an internal structure of the multi-function device 1. As shown in FIG. 3, an inclined separation plate 22 is provided on the device rear-surface side of the paper feeding tray 20 which is provided on a bottom side of the multi-function device 1. The inclined separation plate 22 is provided for separating and guiding the recording paper stacked in the paper feeding tray 20. Further, the transporting path 23 is curved to be directed upward from the inclined separation plate 22, and is further bent toward the front-surface side of the apparatus (multi-function device 1) and is extended substantially horizontally toward the front surface. The transporting path 23 is formed to reach the paper discharging tray 21 via (after passing through) the image recording position where the image is recorded by a recording head 24. Therefore, a recording paper P1 accommodated in the paper feeding tray 20 is guided by the transporting path 23 from the lower side to the upper side so as to make a U-turn, and reaches to the image recording position. After the image is recorded by the recording head 24 on the recording paper P1, the recording paper P1 is discharged to the paper discharging tray 21. The transporting path 23 is structured by an inner side guide surface and an outer side guide surface facing mutually at a predetermined interval, except at a location where the recording head 24 is provided. Thus, by making the transporting path 23 to be in a horizontal U-shape, both the paper feeding tray 20 and the paper discharging tray 21 can be provided on the front-surface side of the apparatus (multi-function device 1), thereby improving the operability.

Above the paper feeding tray 20, there is provided a paper feeding roller 25 for separating recording papers P1 stacked in the paper feeding tray 20 one by one, and for supplying each of the separated recording papers P1 to the transporting path 23. The paper feeding roller 25 is pivoted (pivotally supported) at a front end of a paper feeding arm 26 which can move vertically (up and down) to come close to and be separated away (apart) from the paper feeding tray 20, and is rotated by transmission of a driving force of a transporting (feeding) motor (not shown in the diagram), which is a drive source, by a drive transmission mechanism.

The paper feeding arm 26 is pivotably (turnably) disposed on a frame which is not shown in the diagram, to swing in a up and down direction, with a base end side (side opposite to the paper feeding tray) as a shaft. The paper feeding arm 26 is pivotable vertically with attaching and detaching of the paper feeding tray 20, such that the recording paper P1 does not interfere with the inclined separation plate 22 while attaching and detaching the paper feeding tray 20. In a stand-by state upon completion of installing (attaching) the paper feeding tray 20, the paper feeding arm 26 is biased downward by a gravitational force and a bias applied by a spring or the like which is disposed in the paper feeding arm 26, and the paper feeding roller 25 pivoted at the front end of the paper feeding arm 26 makes a pressed contact with the recording paper P1 on the paper feeding tray 20. By rotating the paper feeding roller 25 in a state that the paper feeding roller 25 is in a pressed contact with the recording paper P1, due to a frictional force between a roller surface of the paper feeding roller 25 and the recording paper P1, the recording paper P1 at the topmost position in the piled recording papers is sent toward the inclined separation plate 22. The recording paper P1, with a front end thereof in contact with the inclined separation plate 22, is guided upward and is fed to the transporting path 23. Further, when the recording paper P1 at the topmost position in the piled recording papers P1 is fed by the paper feeding roller 25, a recording paper P1 directly below (next to) the recording paper P1 at the topmost position is sent by an effect of a friction and a static electricity in some cases. However, the recording paper P1 next to the recording paper at the topmost position is stopped by a contact with the inclined separation plate 22.

Further, as shown in the diagram, at a mid-point (intermediate position) of the transporting path 23, the recording head 24 is provided. The recording head 24 is installed to the scanning carriage and is constructed to reciprocate in the main scanning direction. Inks of cyan (C), magenta (M), yellow (Y), and black (Bk) colors for example, are supplied to the recording head 24 from ink cartridges (not shown in the diagram), via ink tubes, respectively, and the ink of each of the colors is discharged as minute ink droplets. The image-recording is performed, by this recording head 24, onto the recording paper P1 which is transported on a platen 27.

A pair of rollers which includes a transporting roller 28 and a holding roller (resist roller) 29, and which transports by pinching (holding) the recording paper P1 transported from the paper feeding tray 20 or a recording paper P2 transported from the auxiliary tray 19 is provided at a position, on an upstream side of the recording head 24, in the transporting path 23. On the other hand, a pair of rollers which includes a paper discharging roller 33 and a holding roller 34, and which holds and transports the recording papers P1, P2 onto which recording has been performed, is provided on a downstream side of the recording head 24. The transporting roller 28 and the paper discharging roller 33 are driven intermittently at a predetermined line-feed width (paper-feed width) by the transmission of the driving force from the transporting motor.

On the other hand, the holding roller 29 is rotatably provided such that the holding roller 29 is pressed against the transporting roller 28 with a predetermined pressing force. When the recording paper P1 or P2 is entered between the transporting roller 28 and the holding roller 29, the holding roller 29 is retracted by an amount of thickness of the recording paper P1 or P2, and pinches (holds) the recording paper P1 or P2 together with the transporting roller 28. Accordingly, a rotational force of the transporting roller 28 is transmitted assuredly to the recording paper P1 or P2. The holding roller 34 is also provided in a similar manner with respect to the paper discharging roller 33. The holding roller 34 makes a pressed contact with the recording papers P1, P2 onto which the recording has been performed. Therefore, to avoid degradation of the recorded image when a roller surface comes in contact with the recorded image, the holding roller 34 may be a spur roller having a spur-shaped roller surface.

An auxiliary transporting path 35 is formed in an upper-side portion of the U-shaped transporting path 23, the upper portion being on an upstream side of the image recording position. The auxiliary transporting path 35 is extended from the upper-side portion of the U-shaped transporting path 23 toward the rear-surface side of the apparatus (multi-function device 1), and an open end 36 which is exposed to an outside, is formed in the auxiliary transporting path 23, on the rear-surface side of the apparatus. The auxiliary tray 19 is continuously disposed at the open end 36 of the auxiliary transporting path 35. The recording paper P2 fed from the auxiliary tray 19 is entered into the auxiliary transporting path 35 from the open end 36 of the auxiliary transporting path 35, and is further entered into the transporting path 23 upon being guided by the auxiliary transporting path 35. By such auxiliary transporting path 35, a linear path substantially having no curve is formed starting from the auxiliary tray 19 and reaching to the paper discharging tray 21.

In the U-shaped transporting path 23, the recording paper P1 is transported while being curved (turned) Therefore, the transporting path 23 is unsuitable for transporting a material or object such as a thick paper which is difficult to curve (bend). When performing image recording on such thick paper or the like, it is suitable to use the auxiliary tray 19, and to use the linear path from the auxiliary transporting path 35.

The auxiliary tray 19, as shown in the diagram, is disposed to be projected from the open end 36 of the auxiliary transporting path 35, in a obliquely upward direction from the rear-surface side of the apparatus. The auxiliary tray 19, as described above, is used when image recording is performed on a recording paper of a size and type which is used less frequently, in addition to when image recording is performed by transporting a thick paper or the like, in the linear path. In this case, the recording paper P1 of a size and type which is used frequently can be loaded all the time in the paper feeding tray 20 as the main tray. This structure is convenient since there is no need to change the recording paper P1 which is loaded in the paper feeding tray 20 in order to use the recording paper P2 of different size or different type.

As shown in FIG. 3, the auxiliary tray 19 includes a front-end holding portion 37, an inclined supporting portion 38, and a guide section 39. The front-end holding portion 37 holds a front end, in the transporting direction, of the recording paper P2. The inclined supporting portion 38 inclines (tilts) the recording paper P2 at a predetermined angle which is appropriate for paper feeding, and supports the recording paper P2. The guide section 39 regulates both ends of the recording paper P2 in the width direction. Further, a spindle 40 is disposed in a direction orthogonal to the transporting direction, at a downstream portion of the front-end holding portion 37 in the transporting direction. The auxiliary tray 19 is turned around (about) the spindle 40 to change its posture to a paper-feeding posture and to an accommodation posture which will be described later. In FIG. 3, the auxiliary tray 19 in the paper-feeding posture is shown, and the recording paper P2 can be loaded in the auxiliary tray 19.

The front-end holding portion 37 forms a holding surface which is a substantially horizontal surface and which communicates with (is continued to) the open end 36. The front-end holding portion 37 is, in the auxiliary tray 19 in the paper-feeding posture, a flat-shaped plate member extending from the open end 36 of the auxiliary transporting path 35, up to the rear-surface side of the apparatus. The recording paper P2 is loaded such that the front end of the recording paper P2 in the transporting direction makes a contact with the substantially horizontal surface formed by the front-end holding portion 37. Although it not necessarily indispensable that the holding surface of the front-end holding portion 37 is a substantially horizontal surface, when the holding surface is inclined to be lowered toward the auxiliary transporting path 35, there is a fear that more than one recording papers P2 are transported at a time of paper feeding. On the other hand, when the holding surface is inclined to be raised up toward the auxiliary transporting path 35, the recording paper P2 is easily jammed at the time of paper feeding. Further, minute projections having an acute angle are provided in a line, on the holding surface of the front-end holding portion 37, in the transporting direction, and it is possible to prevent the feeding of more than one recording paper P2 with the minute projections as stoppers.

The inclined supporting portion 38 is a flat-shaped plate member and forms, in the auxiliary tray 19 in the paper-feeding posture, a supporting surface which is continued to the holding surface of the front-end holding portion 37, and which is inclined obliquely upwardly from the rear surface of the apparatus. The recording paper P2 held by the front-end holding portion 37 is maintained to be at a predetermined angle by being supported by the supporting surface of the inclined supporting portion 38. This predetermined angle is an angle appropriate (suitable) for feeding the recording paper P2, and can be set as appropriate by taking into consideration the shape of the auxiliary transporting path 35 or the like.

The guide section 39 is erected, in a stacking direction of the recording paper P2, from both ends in the width direction of the inclined supporting portion 38, and regulates both ends of the recording paper P2. The recording paper P2 placed in the auxiliary tray 19 is fed to a predetermined position in the auxiliary transporting path 35 by being regulated the both ends, of the recording paper P2, in the width direction by the guide section 39. For example, when the image recording is performed with the recording paper P2 is centered with respect to the auxiliary tray 19, a pair of guides 39 on both left and right sides are slidably provided symmetrically with the center in the width direction of the auxiliary tray 19 as a base. The pair of guide sections 39 is slid (slidably moved) according to a width of the recording paper P2 which is to be loaded in the auxiliary tray 19, and the both ends are regulated such that the recording paper P2 is positioned at the center of the auxiliary tray 19.

The spindle 40 fixes the auxiliary tray 19 at a predetermined position on the rear-surface side of the apparatus, and rotatably pivots (pivotably supports) the auxiliary tray 19 such that the posture is changed to the paper-feeding posture and to the accommodation posture. The spindle 40 is provided such that the spindle 40 is projected in a direction orthogonal to the transporting direction, from both ends, respectively, of a downstream portion in the direction of transporting of the front-end holding portion 37 of the auxiliary tray 19. Since the spindle 40 is pivotably supported at an appropriate position in the auxiliary transporting path 35 or a housing of the apparatus (multi-function device 1), the auxiliary tray 19 is structured to be rotatable (turnable) from the paper-feeding posture shown in FIG. 3 to the front-surface side of the apparatus. The auxiliary tray 19 may be structured such that the auxiliary tray 19 can hold the recording paper P2 even in the accommodation posture. In other words, the auxiliary tray 19 may be structured such that, while holding a number and size of recording papers P2 in a range that does not interfere with a tray accommodating section 41 which will be described later, the posture can be changed from the paper-feeding posture to the accommodation posture. Accordingly, when the auxiliary tray 19 is to be accommodated in the apparatus, the recording paper P2 need not to be removed from the auxiliary tray 19. Therefore, the structure is appropriate.

Further, the tray accommodating section 41 for accommodating the auxiliary tray 19 is formed in the upper surface of the printer section 2. The tray accommodating section 41 is a space, formed by a recess provided in the upper surface of the printer section 2, such that an area of the tray accommodating section 41 in a plan view is slightly wider than an area in a plan view of the auxiliary tray 19 when the auxiliary tray 19 is made to assume the accommodation posture. When the scanner section 3 is opened with respect to the printer section 2, the upper side of the tray accommodating section 41 is opened. Further, although it is not necessary to form the tray accommodating section 41 by demarcating (partitioning) clearly from a section for accommodating the ink cartridge, a window for the jamming treatment, or a space provided on the upper surface of the printer section 2 for other purpose. However, it is desired that the tray accommodating section 41 has a supporting surface for supporting the auxiliary tray 19 in the accommodation posture.

Further, as shown in FIG. 3, a paper feeding roller 42 is arranged facing the auxiliary tray 19 in the paper-feeding posture. The paper feeding roller 42 is for separating the recording papers P2, loaded in the auxiliary tray 19, one by one, and for supplying the recording paper P2 to the auxiliary transporting path 35. The paper feeding roller 42 is pivoted at a front end of a paper feeding arm 43 which moves vertically (up and down) such that the paper feeding arm 43 is capable of coming close and separating away from the auxiliary tray 19. An end portion (base end) of the paper feeding arm 43 on a side opposite to the paper feeding roller 42 is pivotably supported at a rear-surface side of the scanner section 3. The paper feeding roller 42, due to a weight of the paper feeding roller 42, is normally at a position at which the paper feeding roller 42 makes a contact with the auxiliary tray 19. However, at a time of loading the recording paper P2 in the auxiliary tray 19, the paper feeding roller 42 can be swung to be retracted from the auxiliary tray 19, by driving the paper feeding arm 43. Further, the driving force of the carriage motor which is a drive source is transmitted to the paper feeding roller 42 and the paper feeding arm 43 by the drive transmission mechanism which is not shown in the diagram. The paper feeding roller 42 is rotated upon being driven (receiving the driving force), and further the paper feeding arm 43 swings. A paper feeding mechanism according to the present invention is realized by this paper feeding roller 42 and the paper feeding arm 43.

Furthermore, in the rear-surface side of the scanner section 3, a roller accommodating section 44 is provided corresponding to the paper feeding roller 42 and the paper feeding arm 43. The roller accommodating section 44 is a recess for accommodating the paper feeding roller 42 and the paper feeding arm 43. The paper feeding roller 42 has a predetermined width and is arranged at a substantial center, of the auxiliary tray 19, in the width direction. The roller accommodating section 44 is formed as a recess which is provided in the bottom surface of a housing of the scanner section 3 that is a rear-surface side facing the auxiliary tray 19, such that a volume of the roller accommodating section 44 corresponds to the width and outer diameter of the paper feeding roller 42. By the swinging of the paper feeding arm 43, the paper feeding roller 42 is moved to a position at which the paper feeding roller 42 is accommodated in the roller accommodating section 44 and to a position at which the paper feeding roller 42 makes a contact with the auxiliary tray 19.

Next, an operation of the multi-function device 1 will be explained. Firstly, a case of performing the image recording on the recording paper P1 fed from the paper feeding tray 20 will be explained. When a print data is transmitted from a computer or a small size memory card, the printer section 2 of the multi-function device 1 starts feeding the recording paper P1 held in the paper feeding tray 20. In other words, when the transporting motor is driven to transmit the driving force to the paper feeding roller 25, the transporting roller 28, and the paper discharging roller 33, thereby rotating these rollers 25, 28 and 33 are rotated so as to feed recording paper P1 from the paper feeding tray 20 to the transporting path 23. The recording paper P1 is transported while being turned over to take an upward U-turn along the transporting path 23, and is reached at the image recording position.

When the front end of the recording paper P1 is transported up to a position directly under the recording head 24, the recording head 24 is scanned and ink is discharged from the recording head 24 based on the print data and end portion information, thereby performing an image-recording in the width direction of the recording paper P1. Then, the recording paper P1 is transported at a predetermined line-feed width (paper-feed width), and again the ink is discharged while scanning the recording head 24, thereby performing the image-recording in the width direction of the recording paper P1. By repeating this operation up to a rear end of the recording paper P1, the desired image is recorded on the recording paper P1. Afterwards, the recording paper P1 onto which the image has been recorded is discharged to the paper discharging tray 21.

Next, a case of recording an image on the recording paper P2 fed from the auxiliary tray 19 will be explained below. When the auxiliary tray 19 is used, as shown in FIG. 3, the auxiliary tray 19 is made to be in the paper-feeding posture and the recording paper P2 is loaded in the auxiliary tray 19. Further, when the print data is transmitted from the computer or the small size memory card, the printer section 2 of the multi-function device 1 starts feeding the recording paper P2 held in the auxiliary tray 19. In other words, the carriage motor is driven and the paper feeding roller 42 is rotated, and the transporting motor is driven and the transporting roller 28 and the paper discharging roller 33 are rotated. Due to the rotation of the paper feeding roller 42, the recording paper P2 loaded in the auxiliary tray 19 is fed to the auxiliary transporting path 35. Further, the recording paper P2 is entered, from the auxiliary transporting path 35, into an upstream side of the image recording position in the transporting path 23, and is reached to the image recording position.

When the recording paper P2 is transported up to the position directly under the recording head 24, the recording head 24 is scanned and ink is discharged from the recording head 24 based on the print data and the end portion information, thereby performing an image-recording in the width direction of the recording paper P2. Then, by repeating the image-forming, up to a rear end of the recording paper P2, in the width direction of the recording paper P2 by transporting the recording paper P2 at a predetermined line-feed width (paper-feed width), a desired image is recorded on the recording paper P2. Further, the recording paper P2 upon completion of image recording is discharged to the paper discharging tray 21.

Figure 4:
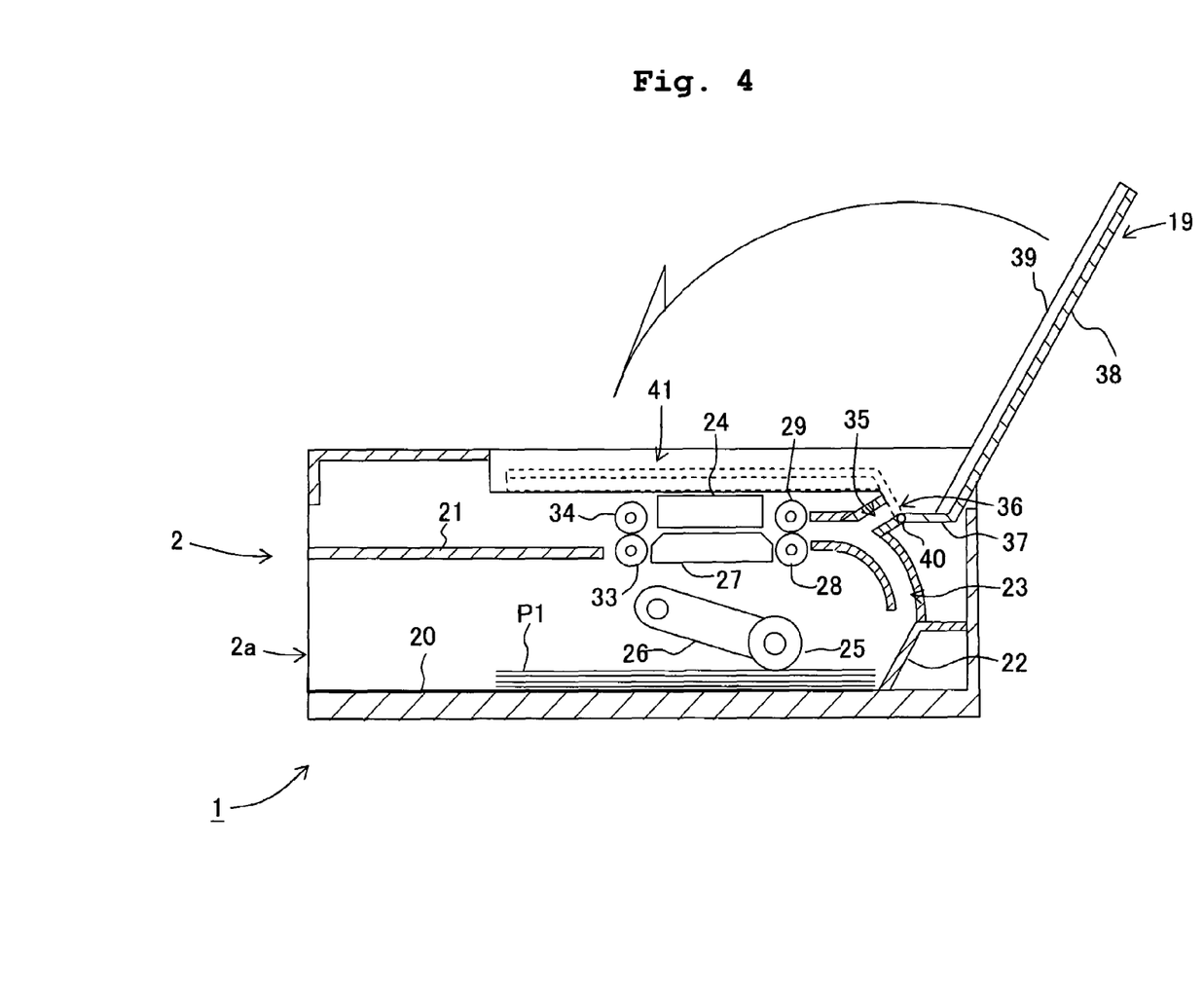
FIG. 4 is a cross-sectional view showing a printer section 2 in a state that a scanner section 3 is opened.

Next, an operation for accommodating the auxiliary tray 19 will be explained below by using FIGS. 2 to 5. In FIG. 4, the scanner section 3 opened upwardly is omitted. For example, when the auxiliary tray 19 is not to be used, the auxiliary tray 19 can be accommodated in the tray accommodating section 41 as follows. Firstly, as shown in FIG. 2, the scanner section 3 is opened by lifting the scanner section 3 upwardly, and the upper side of the printer section 2 is opened. Accordingly, as shown in FIG. 4, the upper side of the tray accommodating section 41 is opened. Further, since the paper feeding roller 42 and the paper feeding arm 43 are arranged in the scanner section 3, the paper feeding roller 42 and the paper feeding arm 42 are lifted upwardly together with the scanner section 3. Accordingly, there is no member, on a turning trajectory of the auxiliary tray 19, which would interfere with the auxiliary tray 19. In other words, when the posture of the auxiliary tray 19 is changed between the paper-feeding posture and the accommodation posture, the auxiliary tray 19 does not interfere with other members.

Further, the auxiliary tray 19 is turned to be in the accommodation posture. Accordingly, the auxiliary tray 19 is accommodated in the tray accommodating section 41. Since the auxiliary tray 19 is formed to be turnable freely around the spindle 40, it is easy to change the posture to the paper-feeding posture and to the accommodation posture. Further, the spindle 40 is provided on the downstream side portion of the front-end holding portion 37 of the auxiliary tray, and the height of the auxiliary tray 19 in the accommodation posture can be lowered (reduced). Therefore, it is possible to reduce a space for the tray accommodating section 41 to save the space, thereby realizing the miniaturization of the multi-function device 1. It is not necessarily indispensable that the recording paper P2 loaded in the auxiliary tray is removed, and within a range in which the auxiliary tray 19 does not interfere with the tray accommodating section 41, the auxiliary tray may take the accommodation posture in a state that the recording paper P2 is loaded in the auxiliary tray 19.

Figure 5:
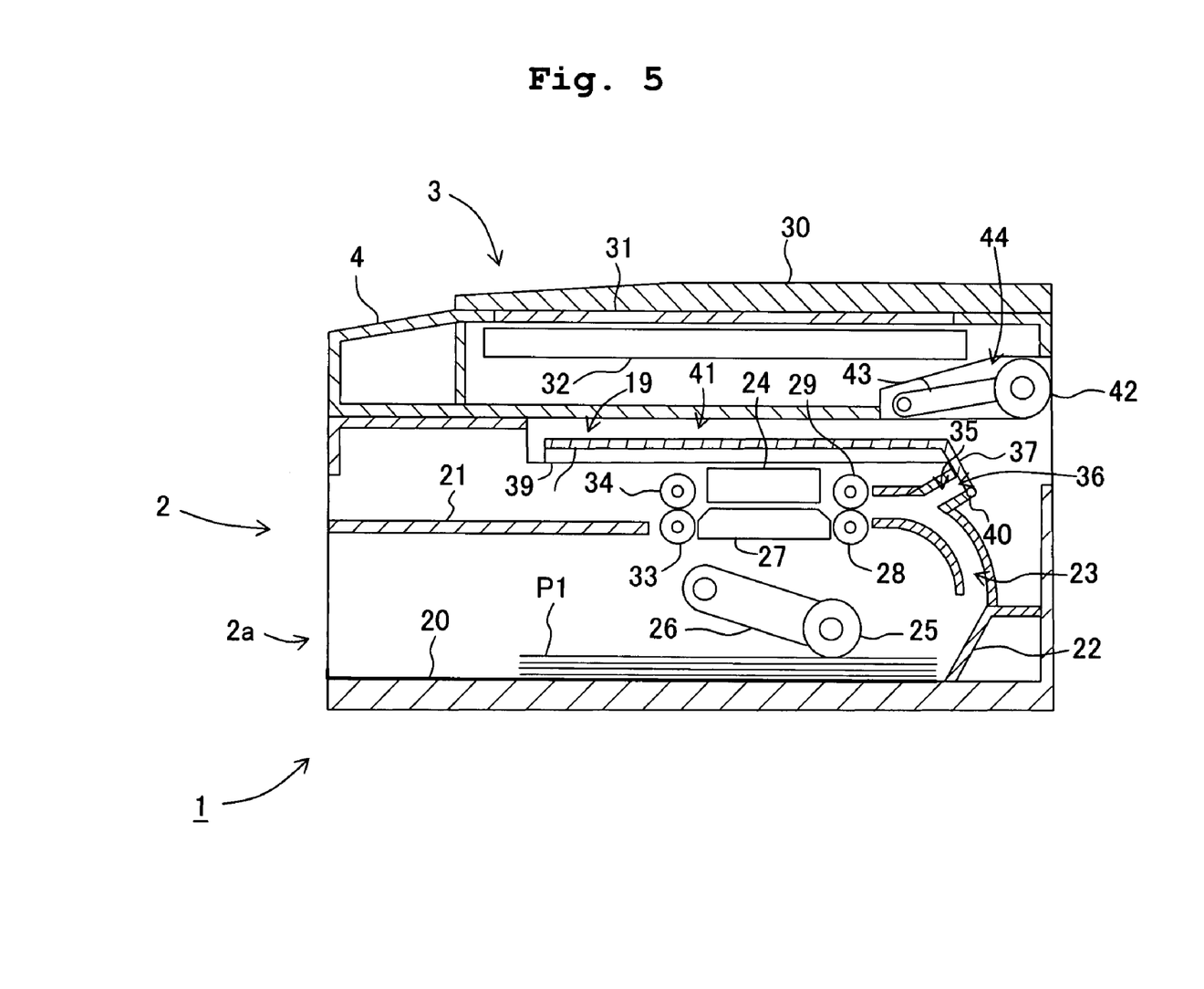
FIG. 5 is a longitudinal cross-sectional view of the multi-function device 1 in a state that an auxiliary tray 19 is accommodated.

After making the auxiliary tray 19 to be in the accommodation posture in this manner, the scanner section 3 which has been opened upward is closed as shown in FIG. 5. Accordingly, the auxiliary tray 19 is accommodated in the multi-function device 1. Further, by making the auxiliary tray 19 to take the accommodation posture, the front-end holding portion 37 closes the open end 36 of the auxiliary transporting path 35. Therefore, dust is prevented from entering into the apparatus from the open end 36 of the auxiliary transporting path 35. Furthermore, when the auxiliary tray 19 is made to be in the accommodation posture, the paper feeding arm 43 is swung upward, and the paper feeding roller 42 is retracted in the roller accommodating section 44. Accordingly, the paper feeding roller 42 and the paper feeding arm 43 are prevented from interfering with the auxiliary tray 19 in the accommodation posture, and a space can be saved near the tray accommodating section 41, particularly in a height direction of the multi-function device 1. Thus it is possible to realize the reduction in size and thickness of the multi-function device 1.

Thus, in the multi-function device 1, the posture of the auxiliary tray 19 can be changed to the paper-feeding posture and to the accommodation posture, and when the auxiliary tray 19 is not to be used, the auxiliary tray 19 can be made to be in the accommodation posture and accommodated in the tray accommodating section 41. Therefore, when the auxiliary tray 10 is not to be used, the auxiliary tray 19 can be accommodated inside the multi-function device 1. Accordingly, there is no member projecting from the rear surface of the multi-function device 1, and the space for installing the multi-function device 1 can be saved.

Figure 6:
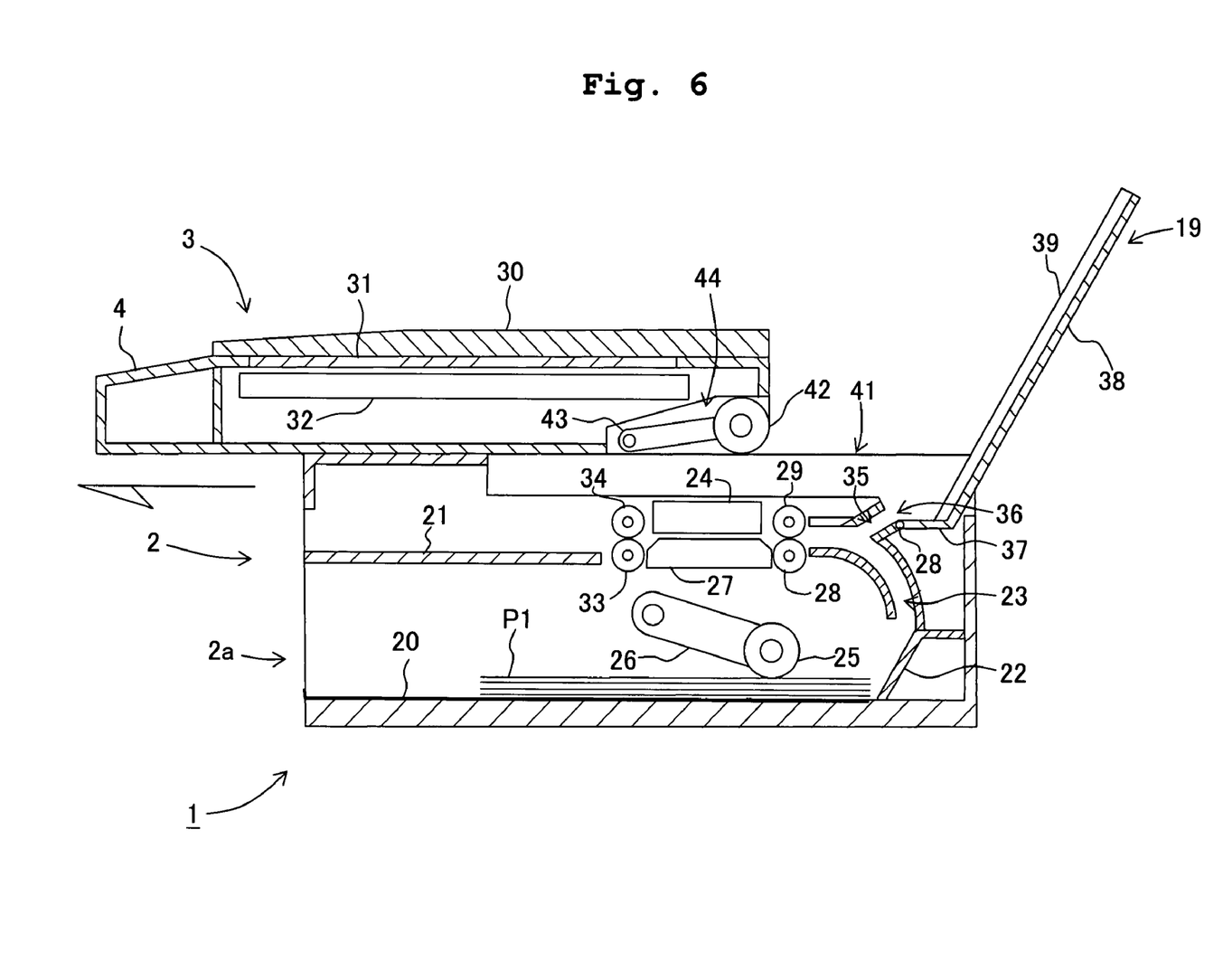
FIG. 6 is a longitudinal cross-sectional view showing a state in which the scanner section 3 is slid toward a front-surface side.

Further, the structure of the multi-function device 1 described above is an example of the image-forming apparatus according to the present invention, and the structure can be modified as appropriate within a scope of the gist of the present invention. In this embodiment, the scanner section 3 is connected by a hinged structure to the printer section 2 on a lower tip of one end side in the side surface of the scanner section 3, and the other end side of the scanner section 3 is opened by turning upward. However, other structure can be adopted as an opening-closing structure of the scanner section 3. For example, as shown in FIG. 6, the scanner section 3 may be connected to the printer section 2 so as to be slidable toward the front-surface side, and by sliding the scanner section 3 toward the front-surface side, tray accommodating section 41 of the printer section 2 may be opened/closed such that the tray accommodating section 41 is opened. Further, when the scanner section 3 is slid in this manner, the paper feeding arm 43 is swung upwardly so that the paper feeding roller 42 is retracted to the roller accommodating section 44. Thus, during the sliding movement of the scanner section 3, the paper feeding roller 42 and the paper feeding arm 43 are prevented from making a contact with various members of the printer section 2.

Further, in this embodiment, the paper feeding roller 42 and the paper feeding arm 43 are driven by the carriage motor of the scanner section 3. However, the paper feeding roller 42 and the paper feeding arm 43 may be driven by transmitting the drive from the transporting motor of the printer section 2 to the paper feeding roller 42 and the paper feeding arm 43. Furthermore, in this embodiment, the open end 36 of the auxiliary transporting path 35 is opened to the rear-surface side of the apparatus, and the auxiliary tray 19 is provided to be projected toward the rear-surface side of the apparatus. However, the positions at which the auxiliary transporting path 35 and the auxiliary tray 19 are provided, respectively, are not limited to be on the rear-surface side of the apparatus, and may be provided on any one of sides of the apparatus upon taking into consideration the arrangement of the paper feeding tray 20 and the paper discharging tray 21, the shape of the transporting path 23, and the like.

In this embodiment, the paper feeding tray 20 as the main tray is provided, separately from the auxiliary tray 19, to the multi-function device 1 which is an image-forming apparatus. It not necessarily indispensable that the multi-function device 1 have two types of trays, namely the main tray and the auxiliary tray. The auxiliary tray 19 of the image-forming apparatus may be the only tray. Conversely, a plurality of trays may be provided in addition to the paper feeding tray and the auxiliary tray. For example, in the multi-function device 1, even when the paper feeding tray 20 is not provided and the auxiliary tray 19 is the only tray, it is possible to use the printer function and scanner function possessed by the multi-function device 1. Further, the auxiliary tray 19, as described earlier, can be accommodated in the tray accommodating section 41. Therefore, when the printer function is not to be used, for example, a portion projecting portion around the multi-function device 1 can be eliminated by accommodating the auxiliary tray 19 in the tray accommodating section 41.

What is claimed is:

1. An image-forming apparatus which performs image-recording on a recording paper, and performs image-reading from a document, the image-forming apparatus comprising:
    an image recording section which has a transporting path in which the recording paper is transported, and which records an image on the recording paper at an image recording position in the transporting path;

a tray on which the recording paper is placed; an image reading section which is provided above the image recording section, and which reads an image from the document; and a tray accommodating section which is provided between the image recording section and the image reading section, and which accommodates the tray; wherein:

the image reading section is provided to be movable such that the tray accommodating section is opened; and a posture of the tray is changeable to a paper-feeding posture in which the tray guides the recording paper to the transporting path and to an accommodation posture in which the tray is accommodated in the tray accommodating section.

2. The image-forming apparatus according to claim 1, wherein the tray is an auxiliary tray, and the image-forming apparatus has a main tray which is different from the auxiliary tray.

3. The image-forming apparatus according to claim 2, wherein:

the image recording section further includes an auxiliary transporting path which is merged with the transporting path on an upstream side of the image recording position in the transporting path, and which has an opening which is opened toward a side portion of the image recording section;

the image reading section includes a paper feeding mechanism which is provided to be capable of making contact with the auxiliary tray in the paper-feeding posture;

the transporting path communicates with a placing section of the main tray on which the recording paper is placed and a discharge section to which the recording paper is discharged; and the auxiliary tray is formed to project toward a side portion of the image-forming apparatus from the opening of the auxiliary transporting path.

4. The image-forming apparatus according to claim 3, wherein the tray accommodating section is formed as a recess in an upper surface of the image recording section; and the image reading section is moved such that an upper side of the tray accommodating section is opened.

5. The image-forming apparatus according to claim 4, wherein:

the auxiliary tray include a front-end holding portion which holds a front end, of the recording paper, in a transporting direction;

an inclined supporting portion which inclines the recording paper at a predetermined angle appropriate for paper feeding and supports the recording paper; and a spindle which is provided, in a direction orthogonal to the transporting direction, at a downstream portion of the front-end holding portion in the transporting direction; and the posture of the auxiliary tray is changed to the paper-feeding posture and to the accommodation posture, by turning the auxiliary tray around the spindle.

6. The image-forming apparatus according to claim 4, wherein the paper feeding mechanism includes an arm which is swingably supported by the image reading section; and a paper feeding roller which is rotatably supported by a front end of the arm.

7. The image-forming apparatus according to claim 6, wherein a roller accommodating section which accommodates the paper feeding roller is formed as a recess in a lower surface of the image reading section.

8. The image-forming apparatus according to claim 4, wherein:

the discharge section is arranged above the placing section; the transporting path is formed to have a horizontally-oriented U-shape such that the transporting path connects the placing section and the discharge section; and the auxiliary transporting path is connected to an upper portion of the U-shaped transporting path.

9. The image-forming apparatus according to claim 4, wherein the opening of the auxiliary transporting path is closed by the auxiliary tray when the auxiliary tray is accommodated in the tray accommodating section.

* * * * *